(12) United States Patent
Wu et al.

(10) Patent No.: US 7,430,901 B2
(45) Date of Patent: Oct. 7, 2008

(54) PRESSURE GAUGE ASSEMBLY FOR BICYCLE TIRE

(75) Inventors: Scott Wu, No. 6, Lane 176, Wu Fu Road, Wu Feng Hsiang, Taichung Hsien (TW); Chien-Lung Cheng, Yunlin Hsien (TW)

(73) Assignee: Scott Wu, Taichung Hsien (TW)

( * ) Notice: Subject to any disclaimer, the term of this patent is extended or adjusted under 35 U.S.C. 154(b) by 97 days.

(21) Appl. No.: 11/618,281

(22) Filed: Dec. 29, 2006

(65) Prior Publication Data

US 2008/0156087 A1    Jul. 3, 2008

(51) Int. Cl.
*B60C 23/02* (2006.01)

(52) U.S. Cl. .......................... 73/146.8; 73/146; 73/732

(58) Field of Classification Search ........... 73/700–756, 73/146–146.8
See application file for complete search history.

(56) References Cited

U.S. PATENT DOCUMENTS

| | | | | |
|---|---|---|---|---|
| 3,999,430 | A * | 12/1976 | Parduhn | 73/146.3 |
| 4,763,516 | A * | 8/1988 | Greenspan | 73/146.8 |
| 4,924,697 | A * | 5/1990 | Hunt et al. | 73/146.8 |
| 5,787,916 | A * | 8/1998 | Shaw | 137/14 |
| 5,992,438 | A * | 11/1999 | Shaw | 137/14 |
| 6,125,694 | A * | 10/2000 | Bledsoe | 73/146.8 |

* cited by examiner

*Primary Examiner*—Andre J. Allen
*Assistant Examiner*—Jermaine Jenkins
(74) *Attorney, Agent, or Firm*—Alan Kamrath; Kamrath & Associates PA

(57) ABSTRACT

A pressure gauge assembly for a bicycle tire includes a gauge portion having an indicator, a shaft, and a lower portion. The shaft includes a recess and a channel portion which is in communication with the recess and the gauge portion. A button is mounted in the recess. The lower portion defines a compartment in communication with the channel portion. Two bushings, respectively, engage two ends of the compartment, and a drive member mounted with an O-ring is included in the compartment. Two holes, respectively, defined on two ends of the drive member are not in communication with each other. A protruding end is defined on an end and a insert end included in another end of the drive member. The drive member is moveable in the compartment.

9 Claims, 7 Drawing Sheets

3-3

PRESSURE GAUGE ASSEMBLY FOR BICYCLE TIRE

FIELD OF THE INVENTION

The present invention relates to a pressure gauge assembly for a bicycle tire. In particular, the present invention relates to a pressure gauge assembly for a bicycle tire that can be used with valves of both American and French types.

DESCRIPTION OF THE RELATED ART

FIG. 7 shows a perspective view of a conventional pressure gauge assembly for a bicycle tire. The conventional pressure gauge assembly comprises a head portion 1 having an indicator, an upper portion 2 and a lower portion 3 which can be coupled to an American type valve 4. The conventional pressure gauge assembly only comprises one lower portion 3 that only be can used with one type of valve.

SUMMARY OF THE INVENTION

It is, therefore, the purpose of this invention to provide a pressure gauge assembly for a bicycle tire, which includes a gauge portion having an indicator, a shaft, and a lower portion. The shaft includes a recess and a channel portion which is in communication with the recess and the gauge portion. A button is mounted in the recess. The lower portion defines a compartment in communication with the channel portion. A first bushing and a second bushing, respectively, engage two ends of the compartment. A drive member having an O-ring mounted thereon us slideable in the compartment. A first hole and a second hole, respectively, are defined on two ends of the drive member, and the first and second holes are not in communication with each other. A protruding end is defined on an end and a insert end is included in another end of the drive member. The drive member is moveable in the compartment.

DETAILED DESCRIPTION OF THE PREFERRED EMBODIMENT

Figure 1:
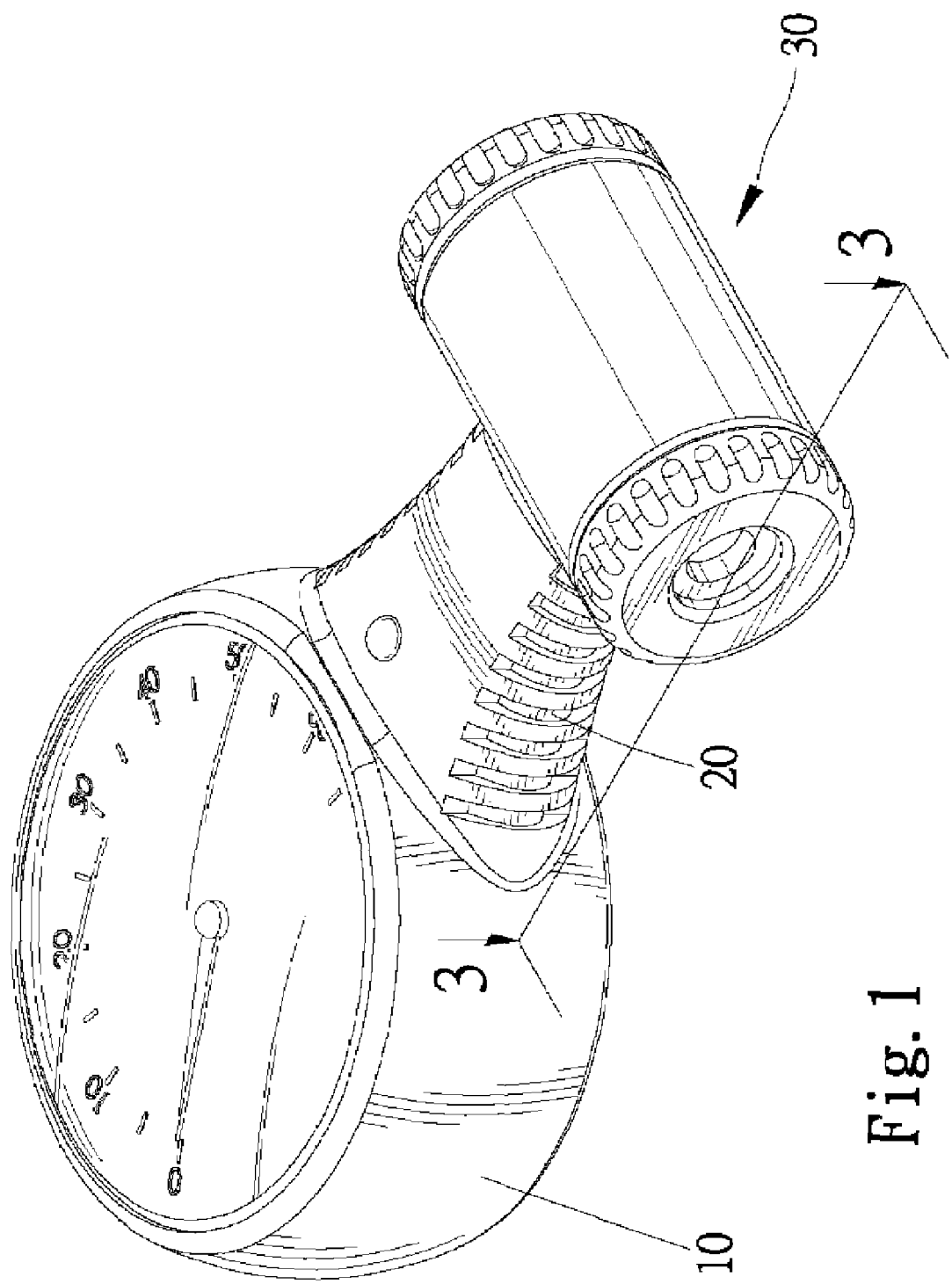
FIG. 1 is a perspective view of a pressure gauge assembly for a bicycle tire in accordance with the present invention.
Figure 2:
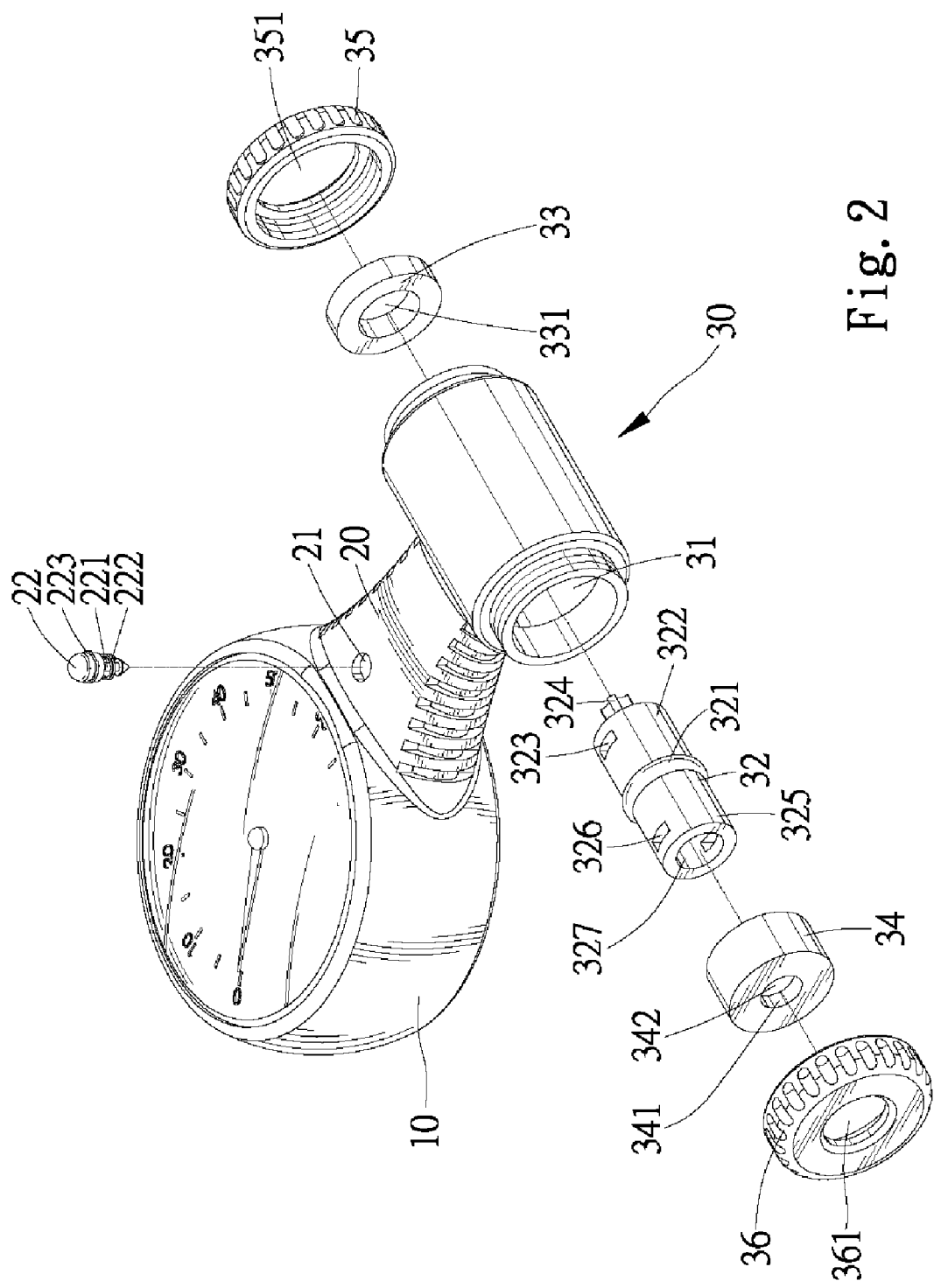
FIG. 2 is an exploded view of a pressure gauge assembly for a bicycle tire in accordance with the present invention.
Figure 3:
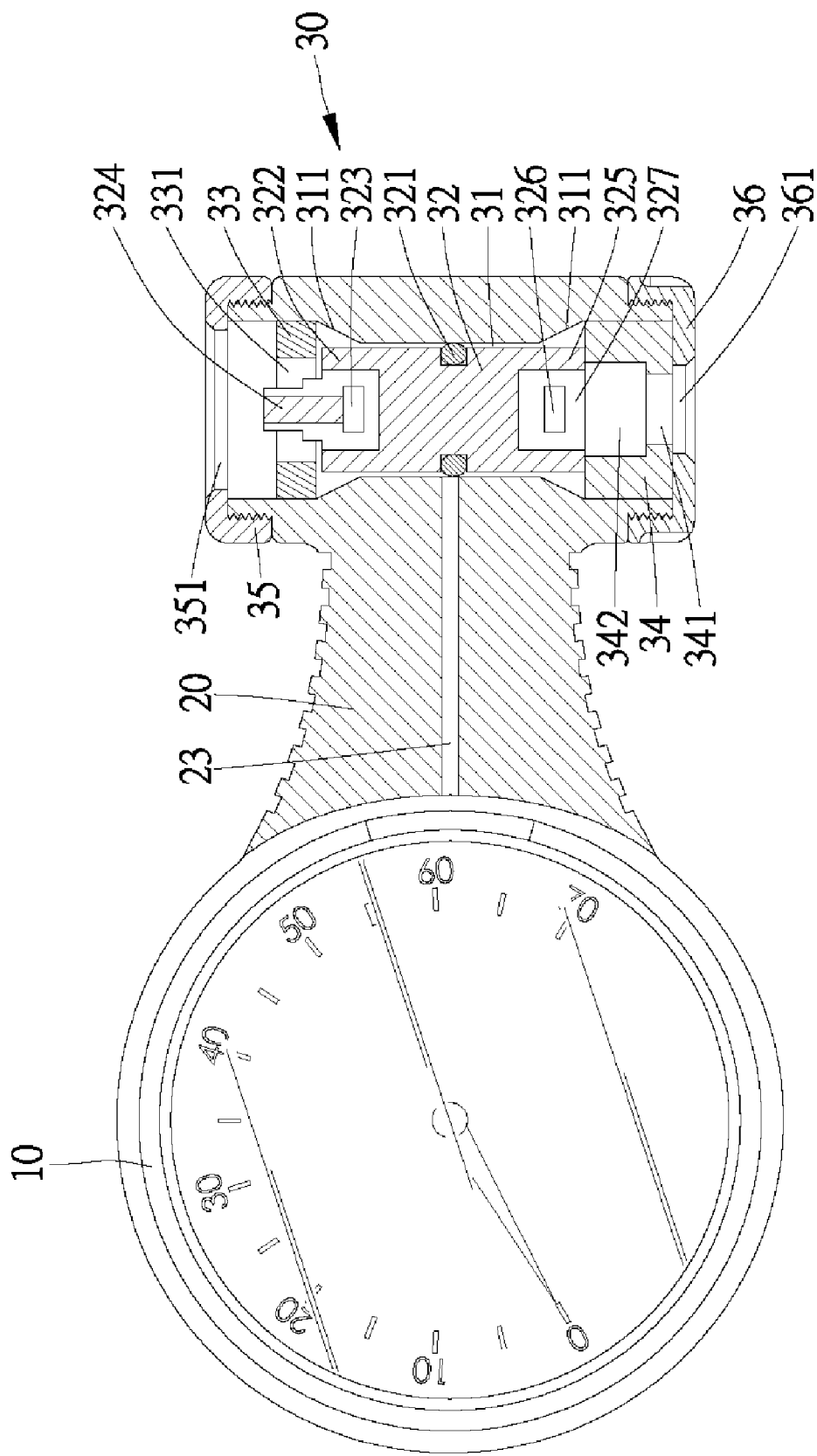
FIG. 3 is a sectional view taken along plane 3-3 in FIG. 1, a sectional view of the shaft and the lower portion in accordance with the present invention.

Referring to FIGS. 1, 2 and 3, the pressure gauge assembly in accordance with the present invention includes a gauge portion 10, a shaft 20 and a lower portion 30. The shaft 20 connects with the gauge portion 10 and the lower portion 30.

The gauge portion 10 is discoidal and has an indicator. A user can get the data of tire pressure via the gauge portion 10.

The shaft 20 includes a recess 21 mounting a button 22 and a channel portion 23 defined in the interior of the shaft 20 communicating with the recess 21. An end of the channel portion 23 communicates to a compartment 31 of the lower portion 30, and another end communicates to the gauge portion 10. The gauge portion 10 measures the pressure and shows it via the indicator. Two sides of the outer surface of the shaft 20, respectively, form a non-slip portion to avoid sliding when a user holds the pressure gauge assembly.

Two ends of the compartment 31 defined in the lower portion 30 are open, and the internal diameter of the compartment 31 decreases from the two ends to the center. A drive member 32 is engaged in the place of the compartment 31 having a smaller internal diameter. The portions between the major and smaller diameters define an inclined surface 311. An O-ring 321 is mounted on the middle of the drive member 32. A first end 322 of the drive member 32 defines a first aperture 323 and a protruding end 324. A second end 325 of the drive member 32 defines a second aperture 326 and an insert end 327. The two apertures 323, 326 are not in communication with each other.

A first bushing 33 is engaged in the interior of the compartment 31 having the major diameter of the compartment 31 near the protruding end 324, and a second bushing 34 is engaged in the interior of the compartment 31 having the major diameter of the compartment 31 near the insert end 327. The first bushing 33 defines a through hole 331, and the second bushing 34 defines a first hole 341 and a second hole 342. A first cap 35 defining a first transverse hole 351 and a second cap 36 defining a second transverse hole 361, respectively, engage with the two ends of the compartment 31.

Figure 4:
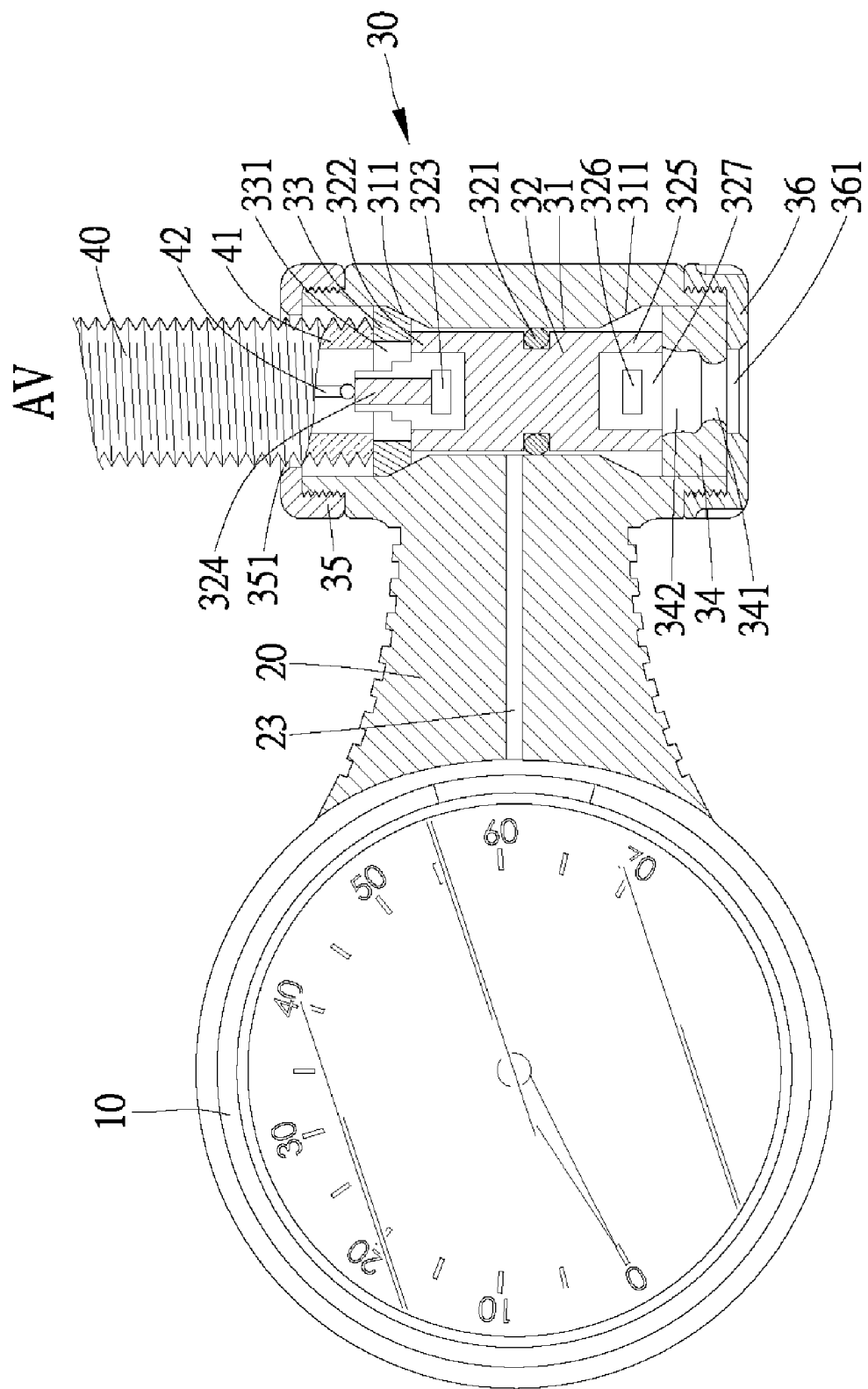
FIG. 4 is a sectional view illustrating use of the pressure gauge assembly for a bicycle tire with an American type valve.
Figure 5:
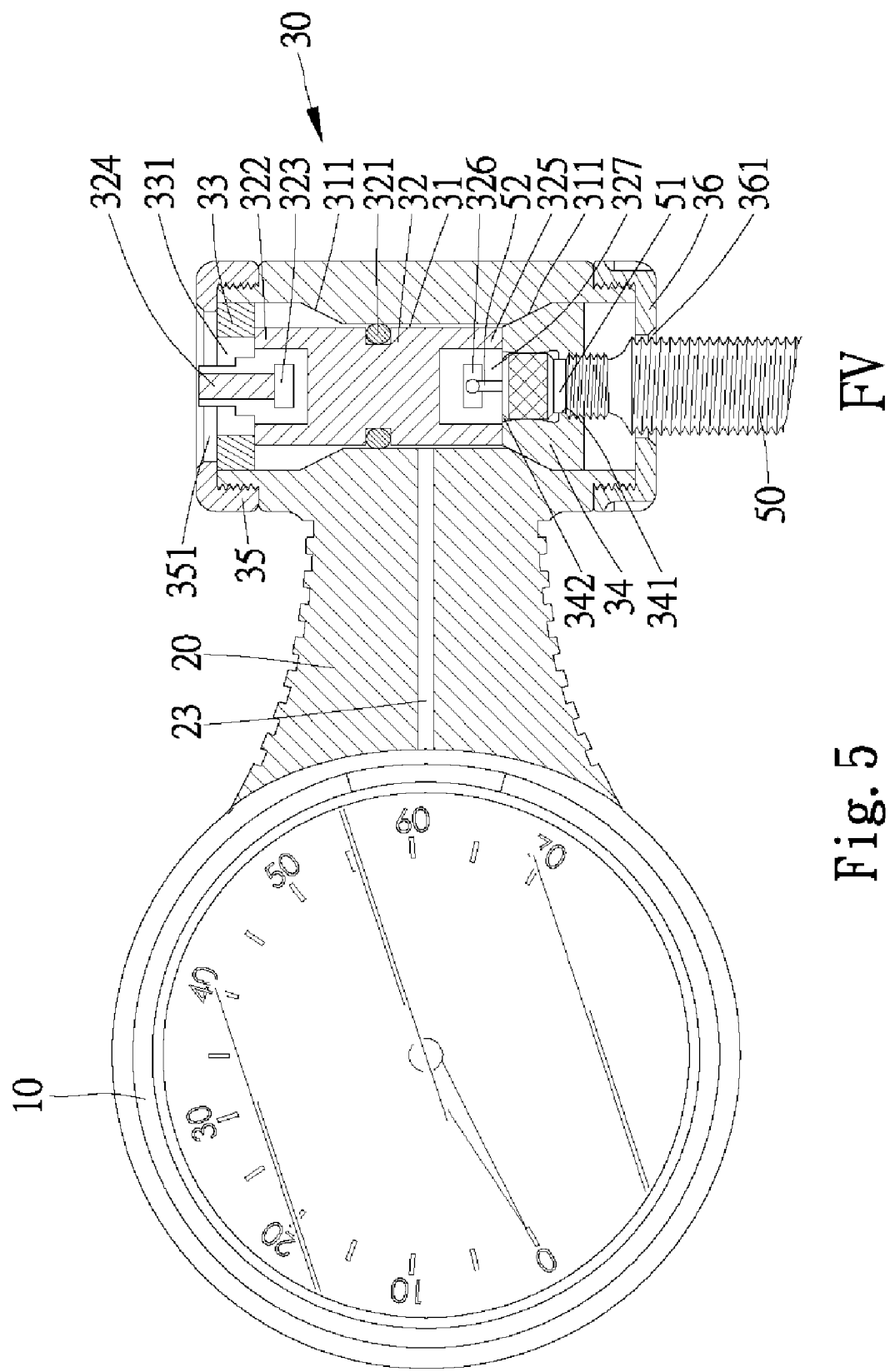
FIG. 5 is a sectional view illustrating use of the pressure gauge assembly for a bicycle tire with a French type valve.

Referring to FIGS. 4 and 5, when measuring the tire pressure with an American type valve 40, the first transverse hole 351 of the first cap 35 couples on the American type valve 40. Specifically, a first nozzle 41 of the American type valve 40 attaches to a side of the first bushing 33, and a first needle 42 abuts with the protruding end 324 so the first bushing 33 is tightly pressing to the inclined surface 311. The through hole 331 of the first bushing 33 receives the protruding end 324. The other side of the first bushing 33 pushes the drive member 32 which in turn pushes the second bushing 34 against the second cap 36. The O-ring 321 of the drive member 32 moves from the place blocking the recess 21 to the place near the second cap 36, and the drive member 32 moves to one side of the second bushing 34 in the compartment 31. The O-ring 321 closes the compartment 31 so that air enters the gauge portion 10 only via the channel portion 23 and shows the data of pressure on the indicator.

When measuring the tire pressure with a French type valve 50, the second transverse hole 361 of the second cap 36 couples on the French type valve 50, Specifically, a second nozzle 51 is mounted in the first hole 341 and the second hole 342, and a second needle 52 is mounted in the insert end 327 so that air enters the channel portion 23 via the first aperture 323. The second bushing 34 is tightly pressed against the inclined surface 311. The second bushing 34 pushes the drive member 32 which in turn pushes the first bushing 33 against the first cap 35. The O-ring 321 of the drive member 32 moves to the place near the first cap 35, and the drive member 32 moves to the first bushing 33 in the compartment 31. The O-ring 321 closes the compartment 31 so that air enters the gauge portion 10 only via the channel portion 23 and shows the data of pressure on the indicator.

Figure 6:
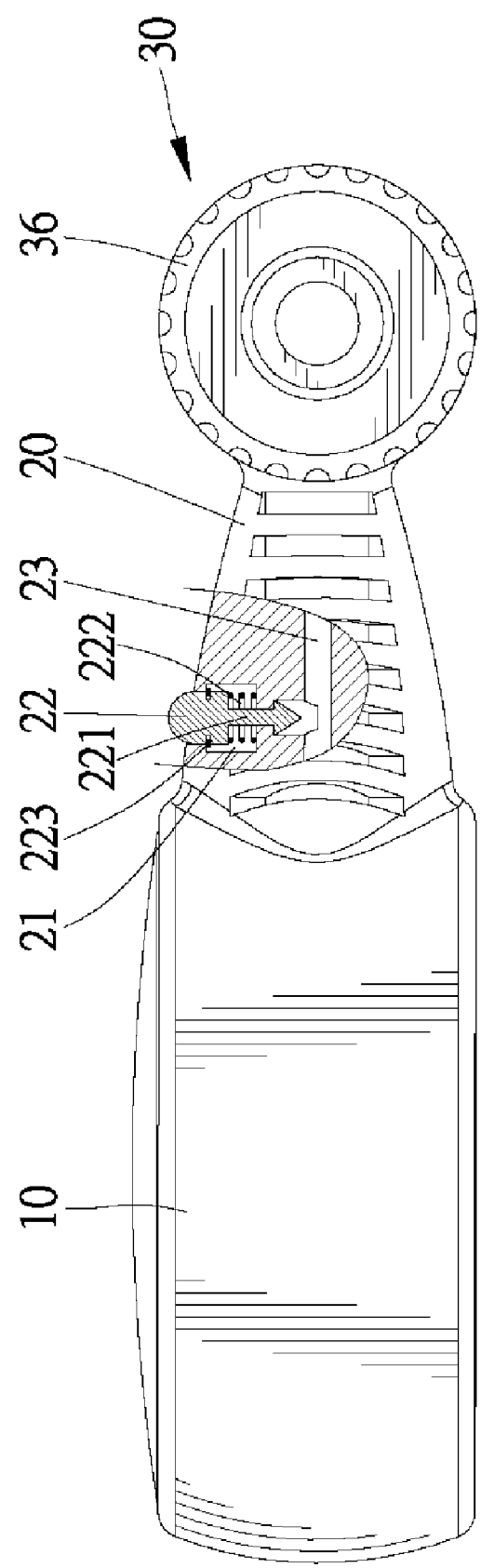
FIG. 6 is a sectional view of the button in accordance with the present invention.
Figure 7:
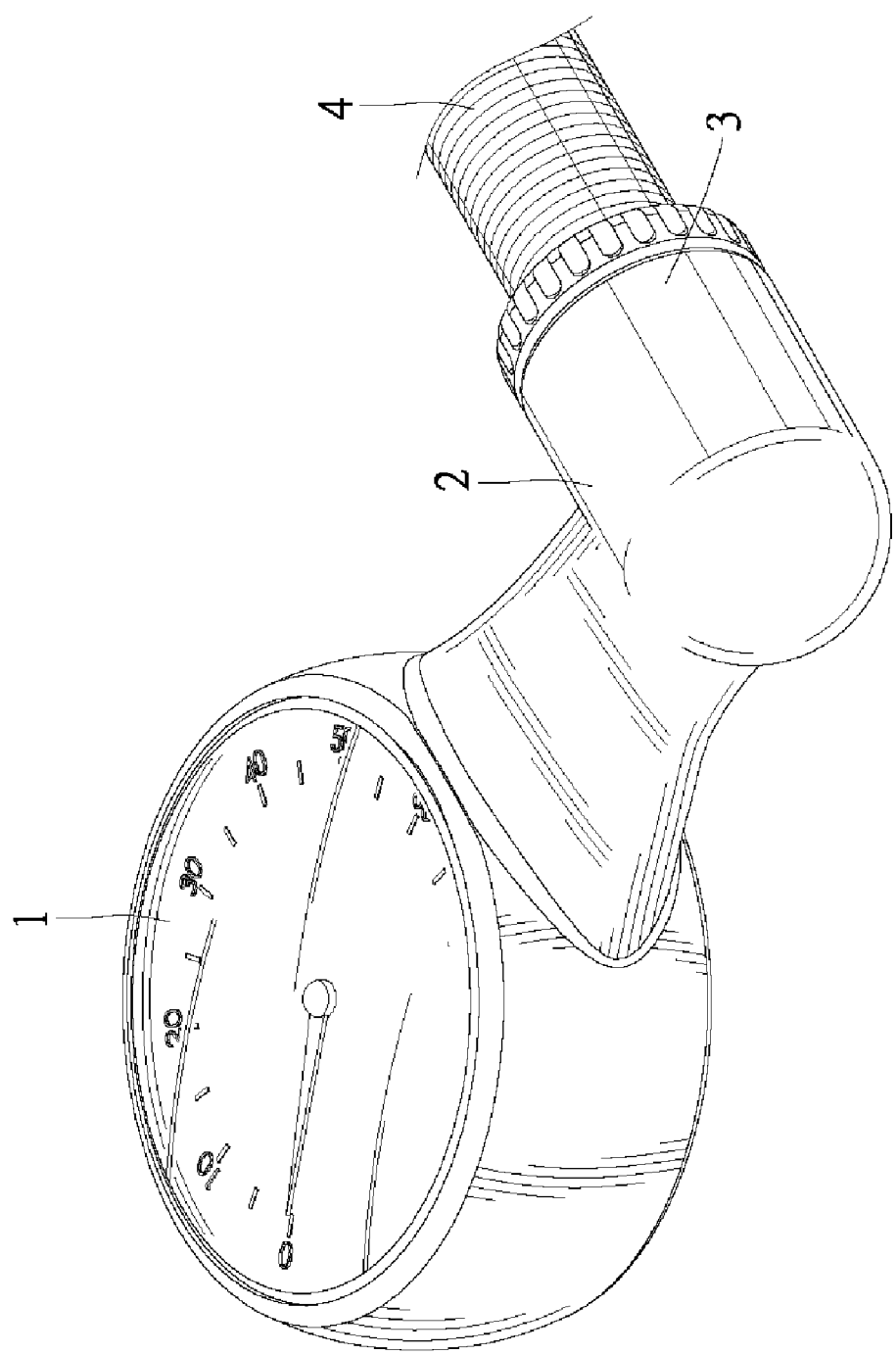
FIG. 7 is a perspective view of a conventional pressure gauge assembly for a bicycle tire.

Referring to FIG. 6, the shaft 20 includes the recess 21 in communication with the channel portion 23. A button 22 includes a pin 221 which is mounted in an elastic element 222 and is mounted in the recess 21 via a fixed element 223. When the tire pressure measured is higher than ideal pressure, air could slowly leak to the recess 21 via the channel portion by pressing the button 22. Therefore, a user could observe the leak data via the gauge portion 10 and get the ideal tire pressure easily.

Summarizing the above-mentioned, the advantages of the present invention are:

1. The pressure gauge assembly for a bicycle tire can be used with valves of both American and French types, and it could save the cost and the space.

2. The pressure gauge assembly for a bicycle tire includes a button, and it is easy to get the ideal tire pressure via use thereof.

3. The pressure gauge assembly for a bicycle tire comprises a compartment having two ends thereof defining an inclined surface, and the bushings abutting with the inclined surface could close the compartment against leaking.

Although a specific embodiment has been illustrated and described, numerous modifications and variations are still possible. The scope of the invention is limited by the accompanying claims.

What is claimed is:

1. The pressure gauge assembly for a bicycle tire comprising:
    a gauge portion including an indicator;
    a shaft including the gauge portion formed on an end thereof, a channel portion defined in the shaft communicating with the indicator;
    a lower portion formed on another end of the shaft including a compartment in communication with the channel portion;
    a first bushing and a second bushing respectively received in two ends of the compartment; a drive member with an O-ring mounted thereon and located in the compartment;
    a first aperture and a second aperture respectively defined on two ends of the drive member, with the first and second apertures not in communication with each other; and
    a protruding end defined on one of the two ends of the drive member and a insert end included in the other of the two ends of the drive member, with the drive member moveable in the compartment.

2. The pressure gauge assembly for a bicycle tire as claimed in claim 1, with an internal diameter of the compartment decreasing from the two ends to a center, and with the drive member engaging in a place of the compartment having a smaller internal diameter and the first and second bushings respectively engaging in the compartment having major internal diameters.

3. The pressure gauge assembly for a bicycle tire as claimed in claim 2, wherein the compartment between the major and smaller diameters defines an inclined surface.

4. The pressure gauge assembly for a bicycle tire as claimed in claim 1, wherein the first bushing defines a through hole for coupling with an American type valve.

5. The pressure gauge assembly for a bicycle tire as claimed in claim 1, wherein the second bushing defines two holes for coupling with a French type valve.

6. The pressure gauge assembly for a bicycle tire as claimed in claim 1, further comprising a first cap and a second cap respectively engaging the two ends of the compartment.

7. The pressure gauge assembly for a bicycle tire as claimed in claim 1, wherein recess is defined on the shaft in communication with the gauge portion via the channel portion, and a button is mounted in the recess.

8. The pressure gauge assembly for a bicycle tire as claimed in claim 7, with the button including a pin mounted in an elastic element and mounted in the recess via a fixed portion.

9. The pressure gauge assembly for a bicycle tire as claimed in claim 1, wherein each of two sides of an outer surface of the shaft has a non-slip portion.

\* \* \* \* \*